US005795182A

United States Patent [19]
Jacob

[11] Patent Number: 5,795,182
[45] Date of Patent: Aug. 18, 1998

[54] POLARITY INDEPENDENT BATTERY JUMPER CABLES OR CHARGER WITH AUTOMATIC POLARITY DETECTOR AND BUILT-IN AUTOMATIC SAFETY FEATURES

[75] Inventor: Elijah Jacob, Los Angeles, Calif.

[73] Assignee: Modern Technology Inventions, Los Angeles, Calif.

[21] Appl. No.: 686,378

[22] Filed: Jul. 25, 1996

[51] Int. Cl.⁶ .................................................. H01R 11/00
[52] U.S. Cl. ............................................ 439/504; 439/490
[58] Field of Search ................................. 439/504, 506, 439/490, 188; 320/25–6

[56] References Cited

U.S. PATENT DOCUMENTS

| | | | |
|---|---|---|---|
| 3,413,487 | 11/1968 | Gershen | 307/127 |
| 3,700,999 | 10/1972 | Gourse | 320/26 |
| 4,166,241 | 8/1979 | Grant | 320/25 |
| 4,349,774 | 9/1982 | Farque | 320/25 |
| 4,393,432 | 7/1983 | Neuhaus et al. | 361/104 |
| 4,420,212 | 12/1983 | Wright | 439/504 |
| 4,463,402 | 7/1984 | Cottrell | 361/77 |
| 4,488,147 | 12/1984 | Signorile | 439/504 |
| 4,663,579 | 5/1987 | Yang | 320/26 |
| 5,622,518 | 4/1997 | Kalpaxis | 439/504 |

*Primary Examiner*—Khiem Nguyen
*Assistant Examiner*—Eugene G. Byrd
*Attorney, Agent, or Firm*—Oppenheimer Wolff & Donnelly LLP

[57] ABSTRACT

A polarity independent set of battery jumper cables for jumpering a first battery to a second battery includes a relative polarity detector for detecting whether two batteries are configured cross or parallel, a three-position high current capacity crossbar pivot switch responsive to the relative polarity detector for automatically connecting the plus terminals of the two batteries together and the minus terminals of the two batteries together regardless of whether the configuration detected is cross or parallel, and an undercurrent detector and a delay circuit for returning the device to its ready and unconnected state after the device has been disconnected from one of the batteries. The crossbar pivot switch includes two pairs of contacts, and a pivot arm that pivots about two separate points to ensure full electrical contact between the pairs of contacts. The invention can also be used to produce a battery charger that may be connected to a battery without regard to the polarity of the battery.

15 Claims, 6 Drawing Sheets

POLARITY INDEPENDENT BATTERY JUMPER CABLES OR CHARGER WITH AUTOMATIC POLARITY DETECTOR AND BUILT-IN AUTOMATIC SAFETY FEATURES

BACKGROUND OF THE INVENTION

1. Field of the Invention

The present invention relates to electronic circuits. More particularly the present invention relates to a device whereby a battery may be connected to a voltage supply such as a battery charger or a second battery of the same voltage rating, regardless of the polarity of the battery and the voltage source.

2. Description of the Related Art

In connecting a battery to a supply of D.C. power of the same voltage rating such as a battery charger, the battery and supply must be connected with their polarities matched. If the polarities are mismatched, the power and the battery will be short circuited together. The results will be arcing, extremely large current flow, dangerous overheating of the cables and battery, possible damage to the battery or supply, and possibly even an explosion. When the battery is in an automobile, truck, airplane, or other vehicle, damage to electrical apparatus of the vehicle may occur.

A similar situation occurs when a motorist attempts to "jump start" a vehicle having a dead battery, by using jumper cables to connect the dead battery to a vehicle having a fully charged battery. It is important that the positive terminal of the first battery be connected to the positive terminal of the second battery, and likewise for the negative terminals. However, it is not always possible to guarantee correct polarity matching. In a first situation, an unsophisticated motorist may not know how to properly connect the jumper cables. In a second situation, it may be difficult to determine the polarities of the batteries. This latter situation can occur when the polarity indicating indicia on the batteries is covered with oil and dirt, at night when the indicia is difficult to read, or in the haste and frustration that arises from attempting to jump start a car during extremely adverse weather conditions. Even under ideal circumstances, errors in matching polarities can still occasionally occur due to simple oversight.

In those instances in which polarities are mismatched during an attempt to start a stranded car, not only can the error cause damage to both vehicle electrical systems, but such damage may result in both vehicles becoming disabled in a remote location. For these reasons, it is highly desirable to prevent mismatching of battery polarities when a motorist is attempting to jump start a stranded vehicle.

Several devices have been suggested to prevent such mismatching. U.S. Pat. No. 4,349,774, issued to Farque, discloses a polarity matching apparatus for jumper cables. In Farque's device, the user must rotate the two halves of a housing relative to one another until the two halves lock together. Only then will current flow through the cables. U.S. Pat. No. 4,663,579, issued to Yang, discloses a second approach. Yang's device allows current to flow when two batteries are properly connected, and prevents current from flowing when the two batteries are improperly connected.

In both of these devices, if the jumper cables are initially connected incorrectly then corrective action by the user will be required before the disabled vehicle can be started This additional step may prevent the user from being able to successfully start the disabled vehicle where the user has not familiarized himself with the operating instructions, where the instructions are written in an unfamiliar language, or where the user is otherwise unaware that corrective action is required and what the proper corrective action is.

SUMMARY OF THE INVENTION

The inventor of the present device has recognized a need for a battery charger or a battery jumper cable that may be connected completely without regard to the polarities of the charger and battery in the former case, and without regard to the polarities of the two batteries in the latter case, and that requires no corrective action whatsoever by the user.

Accordingly, it is a general object of the present invention to provide a battery charger which may be connected to a battery to be charged, without regard to the polarity of the battery. It is also an object of the present invention to provide polarity independent jumper cables which will automatically connect together the positive terminals of two batteries, and the negative terminals of the two batteries.

In the present invention, a set of polarity independent battery jumper cables for vehicles and the like is provided, which may be connected to a first battery and to a second battery regardless of their relative polarities. The jumper cables includes a first terminal pair for connecting to the first battery, a second terminal pair for connecting to the second battery, and an automatic crossbar switch for automatically connecting the first and second terminal pairs in such a way that the positive terminals of the two batteries are connected together, and the negative terminals of the two batteries are connected together.

In one disclosed embodiment, a pair of bridge rectifiers rectifies the voltage from both batteries to provide a positive voltage supply of a known polarity to the remainder of the automatic crossbar switching circuitry. A relative polarity detector determines whether the jumper cables have been placed onto the battery terminals so as to define a parallel configuration or a cross configuration, and generates an appropriate polarity indicating PARALLEL or CROSS logic signal, respectively. If the PARALLEL signal is asserted, then a high current three-position crossbar pivot switch is energized so as to establish a parallel connection between the batteries. On the other hand, if the CROSS signal is asserted, then the crossbar switch is energized so as to establish a cross connection between the batteries. Whether the configuration is parallel or cross, the end result is that the positive terminals of the two batteries are connected together, and the negative terminals are also connected together. Until the jumper cable is connected to the batteries, neither the PARALLEL nor the CROSS signal is asserted, and the crossbar switch remains in its unconnected state.

After the crossbar switch has been commanded to one of its two energized states, a first delay of approximately 1 seconds occurs, after which an undercurrent detection circuit is activated. The undercurrent detector senses when one of the jumper cable terminals has fallen off or has been otherwise removed from its battery terminal. If this has occurred, then a disable pulse is generated that disables the PARALLEL and CROSS polarity indicating signals. This pulse causes both the polarity indicating signals to be de-asserted, which in turn causes the crossbar switch to return to its de-energized state. The de-assertion of both polarity indicating signals also causes the disable pulse to be removed after a second delay period, such that the relative polarity detector is once more ready to assert PARALLEL or CROSS as appropriate upon detecting that the jumper cable has been connected to both batteries. Thus, the circuit has been returned to its ready state.

3

With a traditional set of jumper cables when the plus cable terminal falls off one of the batteries, that terminal remains energized to the +12V of the other battery. As such, if the terminal falls off onto a metal part of the car, it can cause sparking and even spot weld itself to the metal part. If it contacts a painted surface it will damage the paint. Furthermore, the sparking can even result in an explosion if it ignites hydrogen fumes which are a byproduct of the battery charging operation.

The present invention protects against this problem. With the present invention, the jumper cable's terminals are not energized until they are physically connected to the terminals of a battery. When one cable end slips off of its battery, the other cable end is automatically de-energized, and the device returned to its unconnected (reset) state. As soon as all cable terminals are physically connected to their respective batteries once more, the terminals are internally reconnected again and charging can resume. As an additional safety feature, the crossbar switch is automatically disconnected when an overcurrent condition occurs.

A polarity independent battery charger is constructed according to similar principles. However, the circuit may be simplified since the polarity of the DC voltage source is already known.

Thus, the invention provides a polarity independent battery charger or jumper cables with automatic polarity detector and built-in automatic safety features. The invention will substantially improve public safety during battery charging operations and jumpering of batteries performed by motorists and roadside assistance service technicians, particularly during inclement weather and at night.

The above-described objects of the present invention and other features and benefits of the present invention will become clear to those skilled in the art when read in conjunction with the following detailed description of a preferred illustrative embodiment and viewed in conjunction with the attached drawings in which like numbers refer to like parts, and appended claims.

DETAILED DESCRIPTION OF THE PREFERRED EMBODIMENTS

Figure 1:
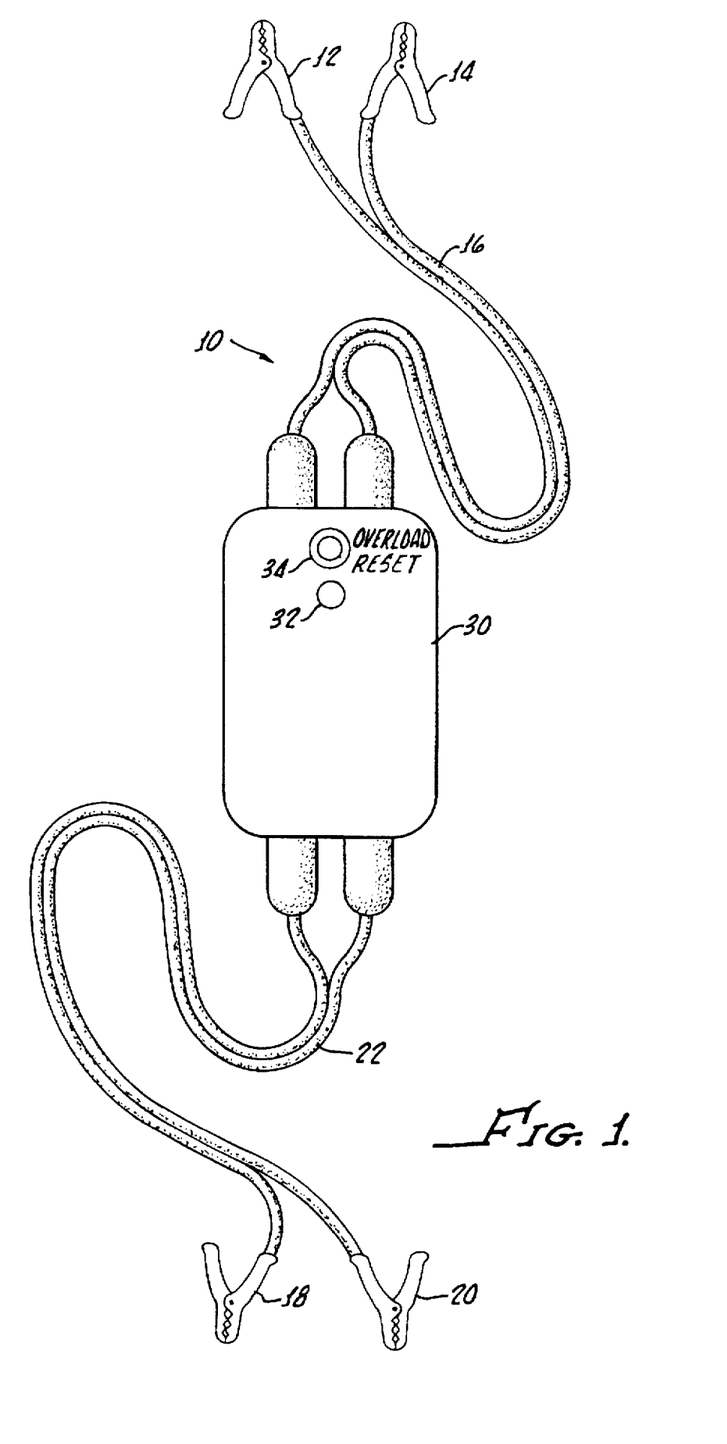
FIG. 1 is a perspective view of battery jumper cables including an automatic crossbar switch device according to the present invention.

In FIG. 1, a set of battery jumper cables 10 includes a first pair of battery terminal clamps 12 and 14, a first cable 16, a second pair of battery terminal clamps 18 and 20, a second cable 22, and a polarity independent automatic crossbar switch device 30. Jumper cables lacking the crossbar switch of the present invention must be connected with the proper relative polarity to the two batteries to which the cables are to be attached. However, with the crossbar switch device 30

4 of the present invention, jumper cables 10 can be connected to both batteries without regard to the polarities of the batteries. Thus, the two batteries may be jumpered together whether clamp 12 and clamp 18 are connected to battery terminals having the same polarity (defining a "parallel" configuration) or having opposite polarities (defining a "cross" configuration).

Figure 2:
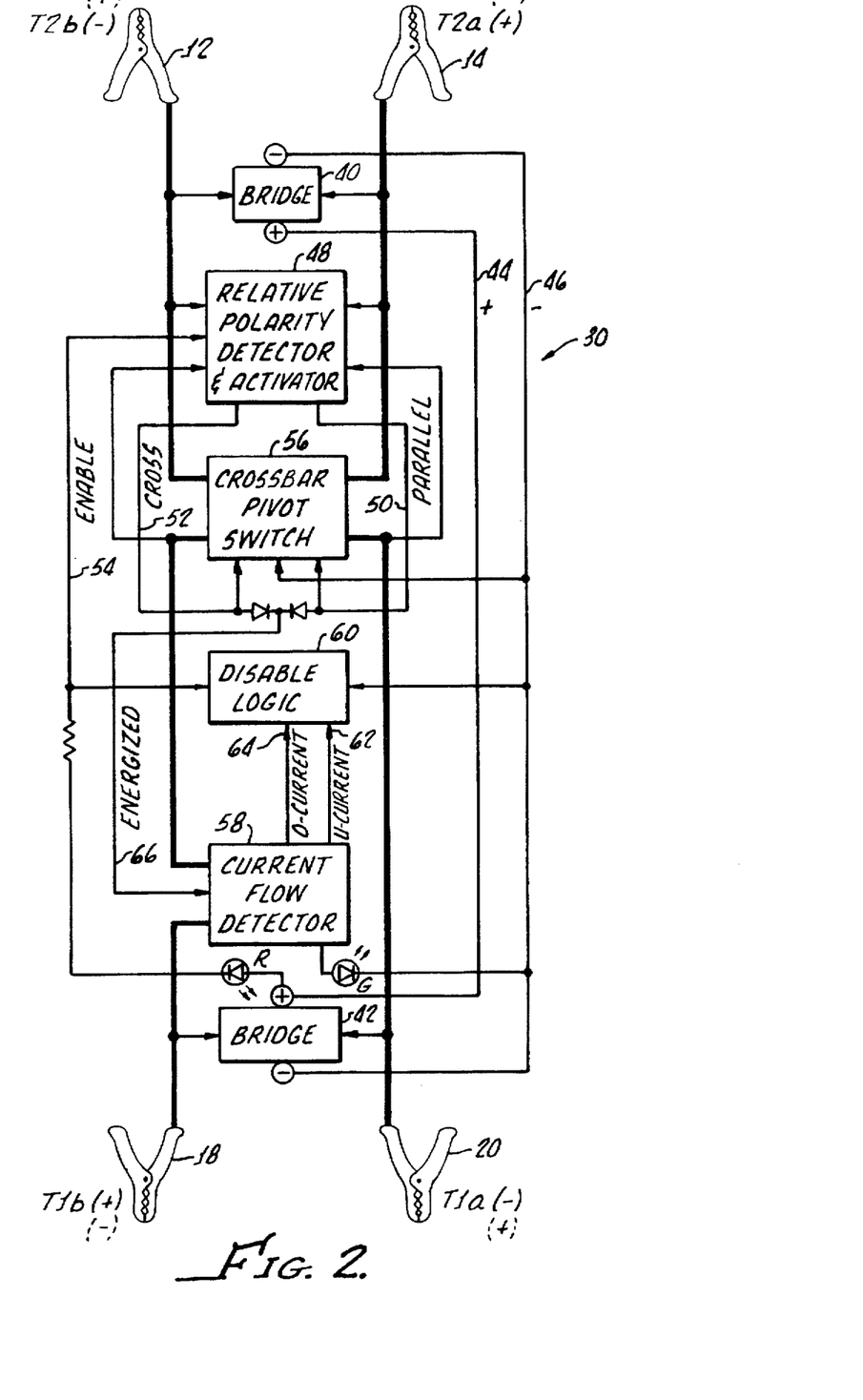
FIG. 2 is a block diagram of the automatic crossbar switch device of FIG. 1.

FIG. 2 is a block diagram of the polarity independent automatic crossbar switch device 30 of FIG. 1. Terminals T1A and T1B correspond to inputs from one battery, and terminals T2A and T2B correspond to inputs from a second battery. Both pairs of inputs may be of either polarity. First bridge rectifier 40 receives the inputs from the first battery, and produces a positive voltage on power bus 44 relative to ground bus 46. Second bridge rectifier 42 performs a similar function, receiving inputs from the second battery. Two rectifiers are used rather than one, because it is not known which of the two batteries will be charged, and which will be drained or "dead". Whichever battery is charged, its associated rectifier 40 or 42 will produce a positive voltage source for use by the rest of the circuitry.

Relative polarity detect circuit 48 senses the polarity of the first battery relative to the polarity of the second battery. That is, polarity detect circuit 48 senses whether the two batteries are arranged in a parallel or a cross configuration. One method of accomplishing this is by implementing the following logic equations:

$$PARALLEL = (T1A \cdot T2A) + (T1B \cdot T2B)$$

$$CROSS = (T1A \cdot T2B) + (T1B \cdot T2A)$$

Initially, device 30 is in a ready state. That is, relative polarity detect circuit 48 is enabled, and neither a cross nor a parallel configuration has yet been detected. Upon detecting either such configuration, relative polarity detect circuit 48 produces one of two output polarity-indicating logic signals: PARALLEL signal 50 and CROSS signal 52. When enabled via a High level on ENABLE signal 54, circuit 48 can assert either PARALLEL or CROSS. When disabled, circuit 48 cannot assert either signal.

When circuit 48 is enabled, if the batteries are connected in a parallel configuration, then PARALLEL signal 50 is asserted. If the batteries are connected in a cross configuration, then CROSS signal 52 is asserted. If one of the batteries is not connected, neither signal is asserted. It will be assumed for the present discussion that signals PARALLEL and CROSS are active High signals, and will be discussed as such for convenience. However, as those skilled in the art will recognize, logic signals may be active High or active Low as the circuitry designer determines to be most convenient for implementing the particular design given such considerations as chip availability; the desirability of using wire OR'd logic, open collector outputs, or normally open versus normally closed relays; and other considerations that are well within the skill of the ordinary designer. Similarly, other logic signals are assigned particular active states, and these assignments are for convenience of discussion only.

If PARALLEL signal 50 goes High (indicating, for example, that both clamps 14 and 20 have been externally connected to battery positive terminals) crossbar pivot switch 56 connects clamp 14 to clamp 20, and clamp 12 to clamp 18. The result is that the positive or "plus" terminal of the first battery is internally connected by the device 30 to the positive terminal of the second battery, and similarly the two battery negative or "minus" terminals are connected together internally. On the other hand, CROSS signal 52 going High (indicating, for example, that both clamps 12 and 20 are battery positive terminals) causes crossbar pivot switch 56 to connect clamp 14 to clamp 18, and clamp 12 to clamp 20. The result, once again, is that the battery positive terminals are connected together, and the battery negative terminals are also connected together. No matter how the two batteries are connected to device 30 therefore, device 30 always internally connects plus to plus, and minus to minus. Thus, jumper cables 10 constitute error proof battery jumper cables. There is no "wrong" way to connect the cables.

It will be observed at this point that once crossbar pivot switch 56 has been driven to either a parallel or a cross state, then device 30 will have a tendency to remain in that state even if one pair of battery clamps is removed from its battery. This is because once clamp 12 is connected to clamp 20, for example, the voltage on clamp 12 will be the same as the voltage on clamp 20, owing to the fact that the two terminals are shorted together by the action of crossbar pivot switch 56. This feedback creates a latch effect, whereby once a given configuration is detected and crossbar pivot switch 56 activated appropriately, crossbar pivot switch 56 is latched to that state.

This latch effect creates a potentially serious problem. Once crossbar pivot switch 56 is latched into a given state by being connected to a pair of batteries, the device will have a tendency to remain in that state even if the battery clamps are removed either intentionally or accidentally from one of the batteries. Should the user then attempt to reconnect the device to that battery, and the battery clamps are placed onto the battery in the opposite configuration as before, the result will be that the batteries will be cross connected. This must be avoided. In order to avoid the above-described problem, the present invention includes a feature for detecting when device 30 has been removed from one of the batteries, and returning device 30 to an unconnected and ready state. This feature is described below.

After the two batteries are connected together and either PARALLEL signal 50 or CROSS signal 52 accordingly goes High, current will begin to flow through the battery loop, including through current flow detector 58. Signal PARALLEL 50 and CROSS 52 are diode OR'd to produce ENERGIZED signal 66. Once ENERGIZED 66 goes High, the current flow detector is enabled. If the current flowing through the battery loop is below a predetermined threshold for more than a first delay period, then undercurrent signal U_CURRENT 62 is asserted High. The predetermined threshold is preferably between 0.1 and 5 amperes, and more preferably approximately 1 ampere. The delay period is preferably between 0.1 and 3 seconds, and more preferably 1 second. This is usually sufficient to allow current to begin flowing in a battery. A shorter delay period, such as 0.1 second, would reduce the chances of an energized lead falling off and shorting even momentarily against a metal part of the car.

If undercurrent signal U_CURRENT 62 indicates by a Low logic level that current has begun to flow within this 1 seconds, then ENABLE signal 54 remains asserted, leaving relative polarity detect circuit 48 enabled. This is the normal operating mode for device 30. It is in this mode that the vehicle with the dead battery may be started.

If, however, any one of the four battery clamps is removed from its battery terminal, current flow detector 58 will sense that current has ceased to flow through the battery loop. When either PARALLEL 50 or CROSS 52 is High but an undercurrent condition is detected, ENABLE signal 54 will be asserted Low within 1 second. When ENABLE goes Low, relative polarity detector 48 is disabled, and both PARALLEL and CROSS are deasserted. This causes crossbar pivot switch 56 to return to its de-energized (unconnected) state. The 1 second delay is short enough such that a user will not have time to remove the first clamp from a battery, and then remove the second clamp and accidentally reverse the leads before the circuit returns to its ready and unconnected state. This circuit therefore prevents device 30 from latching in a given configuration, and then having its leads reversed such as to jumper the batteries incorrectly.

Disable logic 60 deasserts ENABLE signal 54 whenever either PARALLEL or CROSS is asserted, and the current remains below the predetermined threshold (indicating that at least one of the batteries is not completely connected to device 30) for 1 second. After ENABLE has been deasserted, relative polarity detector 48 turns off both PARALLEL and CROSS signals, which in turn causes crossbar pivot switch 56 to return to its de-energized state, and ENERGIZED signal to be deasserted. ENERGIZED going Low then causes ENABLED to be reasserted. In this state, PARALLEL and CROSS are Low, and ENABLED is High. This is the ready state. In this state, device 30 is ready once more to detect when the two batteries are connected and assert PARALLEL or CROSS as appropriate, thereby causing crossbar pivot switch 56 to again connect the plus to the plus and the minus to the minus.

Figure 3:
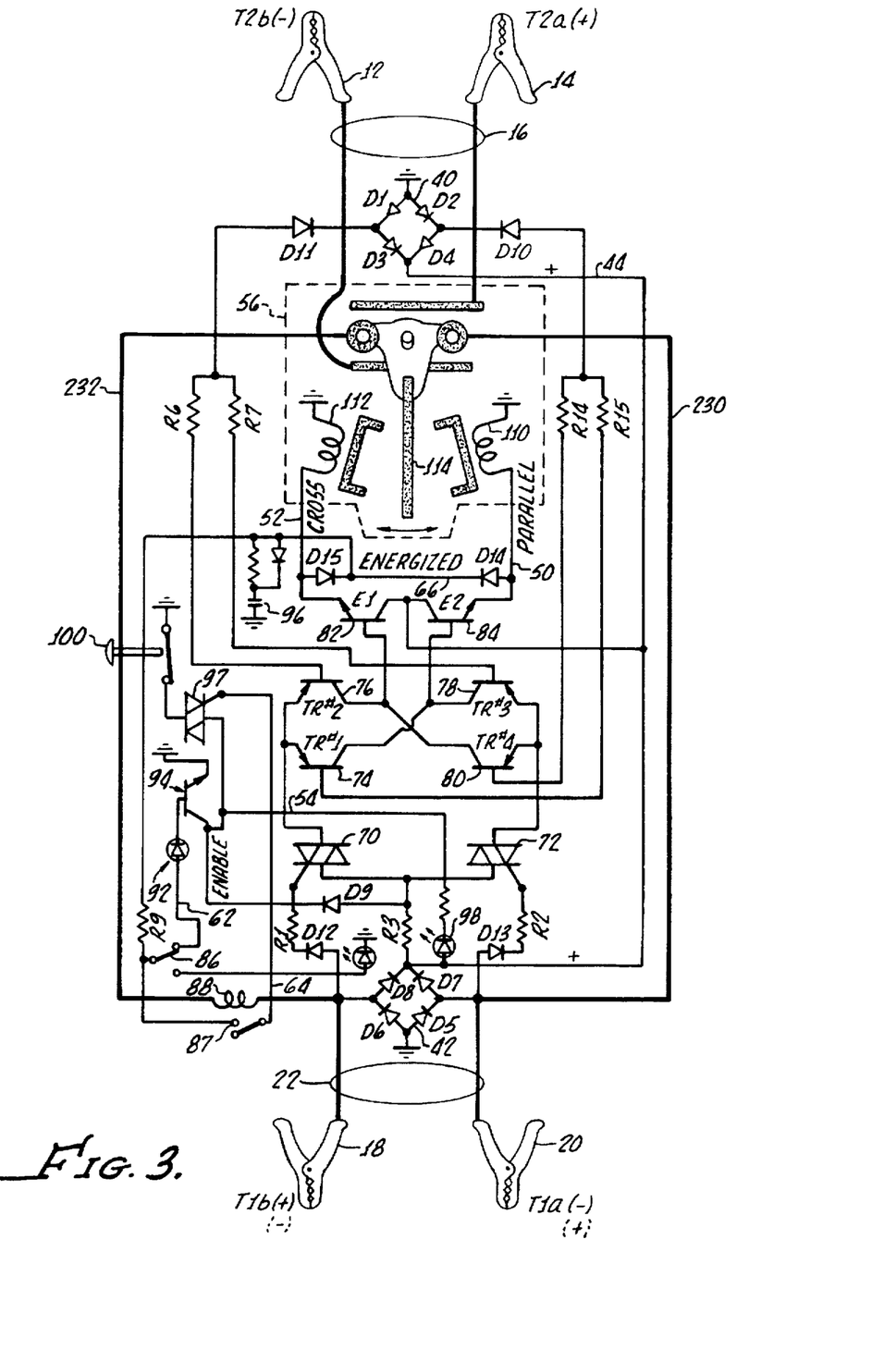
FIG. 3 is a detailed electrical schematic diagram of the automatic crossbar switch of FIG. 2.

FIG. 3 is a detailed schematic illustrating one method of implementing the present invention. First bridge rectifier 40 comprises diodes D1–D4. Second bridge rectifier 42 comprises diodes D5–D8. These two bridge rectifiers produce a positive voltage for use by the rest of the circuit, regardless of the polarity of clamps 12, 14, 18, and 20, and regardless of which battery has charge and which battery is dead. Relative polarity detect circuit 48 (FIG. 2) includes: triacs 70 and 72; PNP transistors 74, 76, 78, and 80; power NPN transistors 82 and 84; diodes D10 and D11; and resistors R6, R7, R14, and R15. Triacs 70 and 72 may be, for example, Motorola part number R1703. PNP transistors 74, 76, 78, and 80 may be, for example, Motorola part number 2N4403 EBC. NPN power transistors 82 and 84 may be, for example, Motorola part number MJE 3055T 9406.

When battery clamps 18 and 20 are connected to a first battery, a positive voltage will be supplied to the gate of either of triacs 70 or 72, depending on whether clamp 18 or clamp 12 is on battery positive, respectively. If triac 70 is turned on, power will be supplied to the collectors of transistors 74 and 76. If triac 72 is turned on, power will be supplied to the collectors of transistors 78 and 80. A negative voltage will be applied to the base of either transistors 76 and 78, or transistors 74 and 80, depending on whether clamp 12 or clamp 14 is connected to the battery negative of the second battery, respectively. Therefore only one of the four transistors will be turned on at any time. For example, if clamp 12 and clamp 18 are both positive and clamp 14 and clamp 20 are both negative (defining a parallel configuration), then triac 70 and transistor 74 will be turned on. This will cause power transistor 84 to turn on, asserting signal PARALLEL 50. This energizes coil 100 of the three-position, high current crossbar pivot switch 56, causing switch 56 to connect the battery clamps in a parallel configuration. That is, clamp 12 will be connected to clamp 18, and clamp 14 will be connected to clamp 20.

Once crossbar pivot switch 56 is energized to either a cross or a parallel position, ENERGIZED signal 66 goes High. This provides power across resistor R9. Relay 86 is a single pole, double throw relay shown in its normal (unenergized) position. At initial connection to the batteries, current will begin flowing across relay coil 88. Assuming this current flow is greater than the predetermined minimum threshold of 1 ampere, relay 86 will provide power to green indicator LED 90 located on the outside of device 30. Green LED 90 lit indicates that the battery cables 10 are hooked up properly, and that current is flowing. This condition would exist when a charged battery is properly connected to a dead battery.

If one of the clamps falls off its battery terminal, then current will cease flowing in the system. This will cause relay 86 to switch positions, driving undercurrent signal U_CURRENT 62 High. Flasher LED 92 functions to provide a delay and is not an external indicator. LED 92 operates at approximately 0.5 Hz in the preferred embodiment. Once U_CURRENT signal 62 goes Hi. This provides voltage to flashing LED 92, which generates pulses of approximately 0.5 Hz frequency. Thus, LED 92 will turn on approximately 1 second later and NPN transistor 94 will go active. This will drive ENABLE signal 54 low. This drains the power source from triacs 70 and 72, thus causing both signals PARALLEL 50 and CROSS 52 to be deasserted. Thus, the pulse from LED 92 has disabled the crossbar switch connection. Signal ENERGIZED 66 will remain active for a short period due to the action of charged capacitor 96 and its associated resistor and diode. Once ENERGIZED 66 goes Low, the base of transistor 94 will no longer be biased, and signal ENABLE will go High again. Device 30 is once more in its ready state.

Sometimes, a malfunctioning battery acts like an open circuit. That is, no current will flow into it. This can happen, for example, if there is no electrolyte in the cells. If the device of the present invention is connected to such a battery, relay 86 will remain in its unenergized state. This provides voltage to flashing LED 92. After a delay ENABLE signal 54 goes Low, which causes red indicator LED 98 mounted on the outside of device 30 to turn on. After a short delay provided by capacitor 96 and its associated resistor, ENERGIZED signal 66 goes Low, turning off flashing LED 92 and allowing ENABLE signal 54 to go High again. Red LED 98 now turns off, and the cycle repeats itself. The result is that red indicator LED 98 flashes. This indicates to the user that the battery is not accepting current, and that the user should check for poor battery connections, dry cells, a defective battery, and the like.

As an additional safety feature, relay 87 provides protection against an overcurrent condition. Relay 87 is normally open, and closes when the current flowing through the cables exceeds a maximum. In the exemplary embodiment, the maximum current is set at 100 amperes, which is approximately 125% of the starting current for even very large vehicles. When this maximum current is exceeded, overcurrent signal O_CURRENT 64 goes High, which turns on triac 97. This drives ENABLE signal 54 Low, which disconnects crossbar pivot switch 56. In this condition, indicator light red LED 98 external to the device is lights up and remains lit, indicating to the user that an overcurrent condition has occurred. Such a condition can occur, for example, if a clamp connected to a battery positive terminal falls off and falls against a metal part of the engine or body before the undercurrent detector detects the undercurrent condition and disables device 30.

Such a condition could also occur in the event of malfunction of one or more components of device 30. The latching properties of triac 97 cause device 30 to remain disabled until normally closed momentary pushbutton switch 100 is pushed by the user. This returns device 30 to its ready state. In the exemplary embodiment, red indicator light 98 and pushbutton switch 100 are an integral unit to simplify the user interface. In FIG. 2, current flow detector 58 comprises relays 86 and 87 and associated coil 88. Of course, each relay 86 and 87 need not share a common coil, and can instead comprise two separate relays with separate coils.

Triacs 70 and 72, being bilateral transistor devices, act as latches. That is, once triac 70 or 72 is turned on by a positive voltage applied to its gate, then current will flow through the device even after the gate voltage is withdrawn. However, once the current through the triac falls below a minimum threshold, a gate voltage must once more be applied in order to turn the device on. The latching function ensures that device 30 will not return to its unconnected state if connections to the battery are lost for a fraction of a second, as for example when a user adjusts the clamps to ensure good connection between the clamp and the battery terminal.

Figure 4:
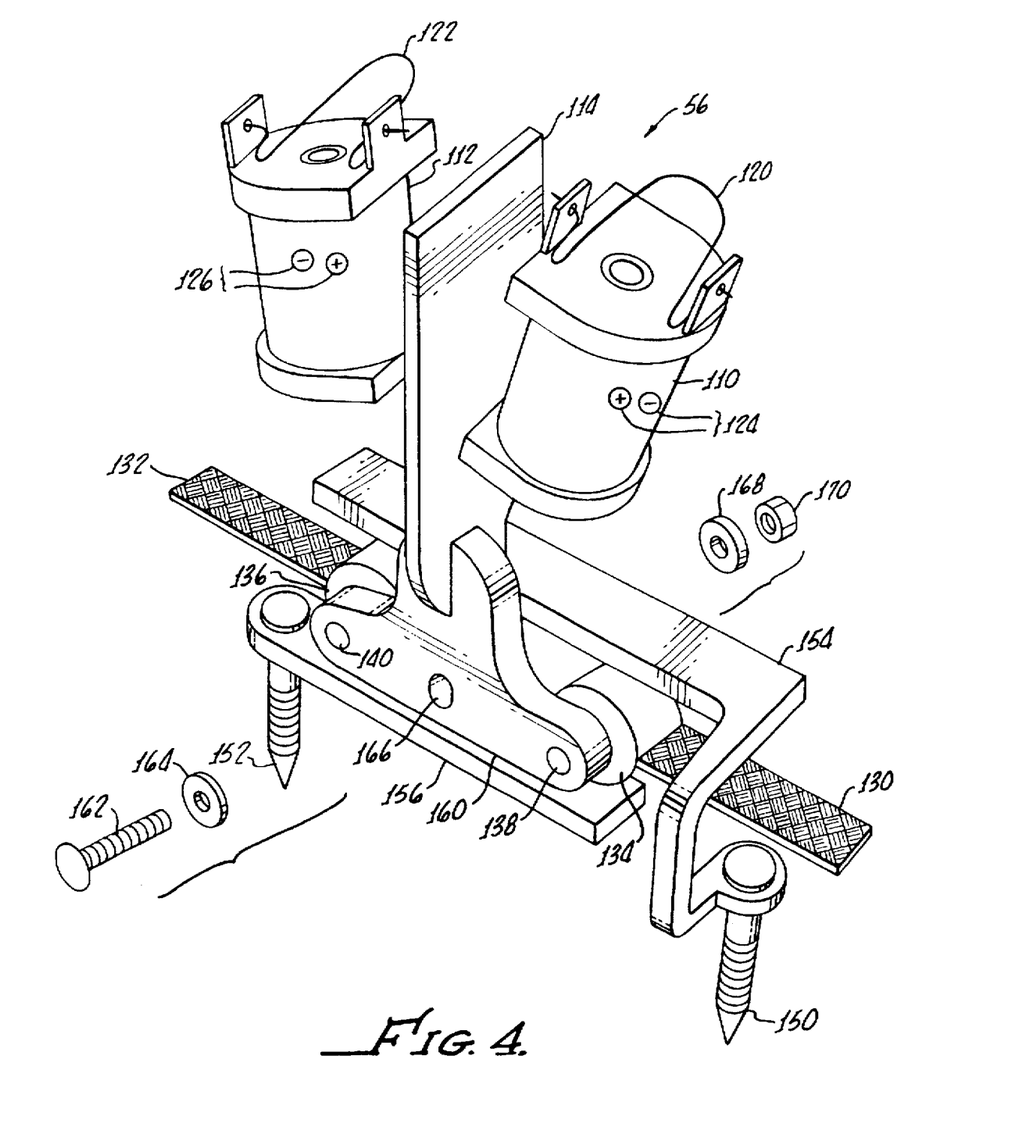
FIG. 4 is a perspective view of the three-position, crossbar pivot switch 56 in FIG. 3.

Crossbar pivot switch 56 of the present invention is a three position, high current relay designed for this application. It provides a three-position relay with enough current carrying capacity for jump starting vehicles, yet at the same time is economical and compact. In the crossbar pivot switch 56 a first energized position creates a cross connection, a second energized position creates a parallel connection, and a third position defines an open circuit. The open circuit position is the de-energized position.

Figure 5:
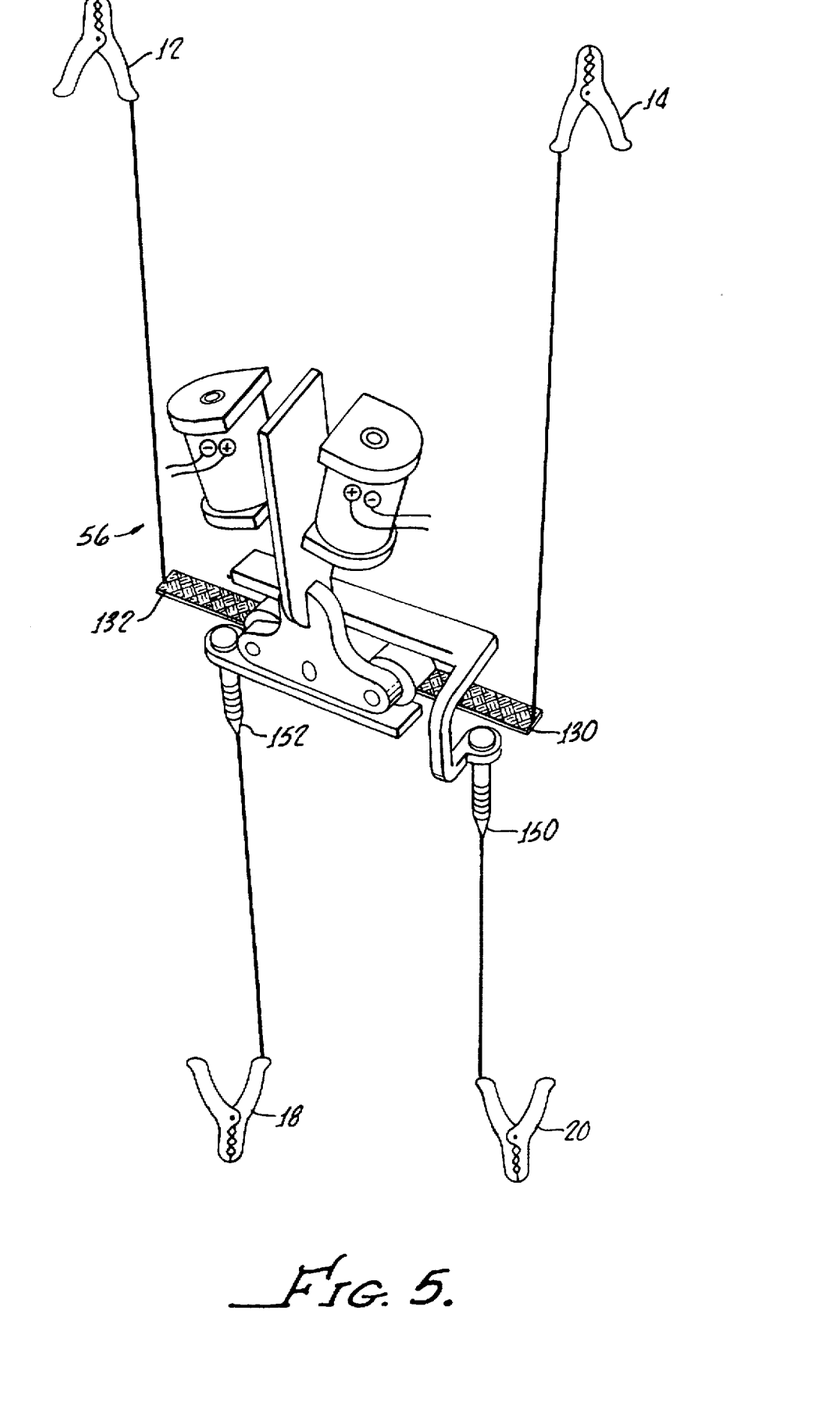
FIG. 5 illustrates the electrical connections to crossbar pivot switch 56 of FIG. 4.

FIG. 4 shows crossbar pivot switch 56 in detail. First and second electrical connections are provided by flexible braids 130 and 132. These connections connect directly to battery terminal clamps as shown in FIG. 5. Third and fourth electrical connections to the other pair of battery terminal clamps is provided by fasteners 150 and 152. First flexible braid 130 is connected to first copper roller 134. Second flexible braid 132 is connected to second copper roller 136. These copper rollers are free to rotate about pins 138 and 140. Fastener 150 is connected to copper bar 154, and fastener 152 is connected to copper bar 156. A support member comprising a plate 160 made from a nonconducting material such as polyurethane, plastic, or other material, physically couples pivot arm 114 to copper rollers 134 and 136. Pivot arm 114 is made of a ferromagnetic material such as a low carbon iron. Coils 110 and 112 are supplied by electrical lead pairs 124 and 126, respectively. Springs 120 and 122 provide a bias means to return switch 56 to its unconnected position when it is de-energized.

When coil 110 is energized, pivot arm 114 is pulled toward coil 110. Pivot arm 114 pivots about bolt 162 inserted through elliptically shaped hole 166. Bolt 162 therefore acts as a pivot pin, providing a pivot point. When pivot arm 114 is pulled toward coil 110, the curved surface of copper roller 136 contacts copper bar 154, thus completing an electrical connection between clamp 12 and clamp 20 (FIG. 5). Nominally, copper bar 134 contacts cooper bar 156 at the same time, thus simultaneously completing an electrical connection between clamp 14 and clamp 18. This creates a cross connection in FIG. 5. However, due to manufacturing tolerances and wear on the electrical contact points, the two copper rollers might not contact their respective copper bars at the same rotational angle. This would prevent the two rollers from each making full contact with the bars. To avoid this problem, pivot hole 166 is shaped elliptically, or otherwise is sufficiently larger than pivot pin 162 to provide clearance around pivot pin 162. This allows linear movement of plate 160 relative to the pivot point. This allows a double pivoting action whereby once copper roller 136 has contacted copper bar 154, pivot arm 114 and plate 160 begin to pivot about a second pivot point at the point of contact between roller 136 and bar 154. Pivot hole 166 moves relative to pivot pin 162, until the curved surface of roller 134 comes into full contact with bar 156. During this movement, plate 160 moves linearly relative to pivot pin 162. Nut 170 such as an acorn nut is not tightened down onto pivot pin 162, thus allowing freedom of movement for plate 160. Low friction washers 164 and 168 further facilitate free movement of plate 160.

Similarly, when coil 112 is energized instead of coil 110, pivot arm 114 is drawn toward coil 112. This causes roller 134 to contact bar 154, and roller 136 to contact bar 156. This connects clamp 14 to clamp 20, and clamp 12 to clamp 18. This defines a parallel electrical connection.

In a second embodiment of the high current switch, plate 160 need not move relative to pivot pin 162. Rather, conductive plates 154 and 156 are spring biased. When pivot arm 114 rotates enough so that a first contact is made between roller 136 and conductive bar 154, the spring that biases the bar compresses slightly to allow further rotation of plate 160, until both rollers are in full contact with their respective conductive bars. In a third embodiment of the high current switch, rollers 134 and 136 have oversized holes for pivot pins 138 and 140, which allow the necessary movement of plate 160 relative to the points of electrical contact between the rollers and the conductive bars.

In FIG. 1, it will be seen that only wires 230 and 232 carry the current that flows between the batteries. Thus, only these wires must be properly sized to provide sufficient current carrying capability. In the exemplary embodiment, the current carrying wires are 8 AWG THNN wire.

As an additional feature of the present invention, device 30 may also be equipped with a manual override feature. This feature would allow a user to override the circuitry, and manually force the device into a given state such as a parallel state so that the device can be used as a traditional jumper cable should the electronic circuitry within the device fail. In an alternative embodiment, crossbar pivot switch 56 is replaced by one or more suitable solid state devices such as a pair of Insulated Gate Bipolar Transistors (IGBTs).

Figure 6:
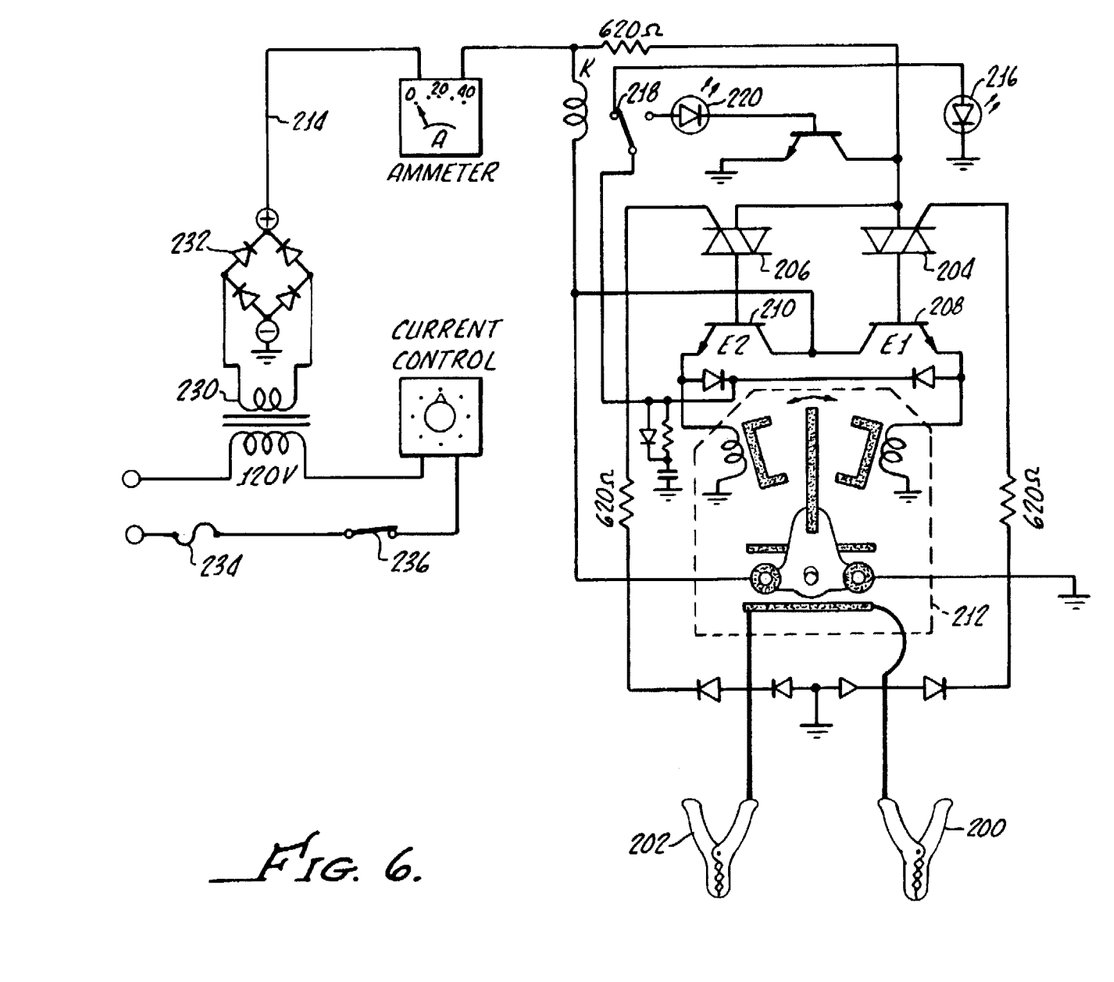
FIG. 6 is a detailed electrical schematic diagram of a battery charger constructed according to the present invention.

FIG. 6 shows the above-described invention as applied to a battery charger. A battery charger application requires less circuitry, because the bridge rectifiers for generating a voltage supply from the batteries can be eliminated. DC power is supplied by the battery charger power supply, which in most instances is derived from 120 VAC line input power. The simplified AC-to-DC converter shown includes transformer 230, which is a 120/12 V transformer rated at 1.5 KVA, and bridge 232 together form an AC-to-DC converter. The DC power supply also includes circuit breaker 234 and on/off switch 236. In this application, only the absolute polarity of the battery needs to be detected, rather than the relative polarity of two batteries as in the jumper cable application.

If clamp 200 is connected to battery positive, then triac 204 and power transistor 208 will be turned on, thus driving crossbar pivot switch 212 to connect clamp 200 to positive voltage supply bus 214. If instead clamp 202 is connected to battery positive, then triac 206 and power transistor 210 will be turned on, thus driving crossbar pivot switch 212 to connect clamp 202 to positive voltage supply bus 214. Either way, green LED 216 indicates that the battery is charging properly, and relay 218 and flashing LED 220 disable the circuitry if an undercurrent condition is detected for more than the specified delay period.

In a battery charger constructed according to the present invention, battery clamps 200 and 202 are not energized until the circuitry detects that the clamps have been connected to a battery. Even after charging has begun, if one of the clamps falls off its battery terminal power to the clamps will be turned off, either within approximately 1 second if no current is flowing, or immediately if the clamps are shorted together. This will prevent much of the sparking and shorting that often occurs when live battery charger terminals are not kept properly separated from each other.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A polarity independent battery jumper cable apparatus for vehicles and the like, which may be operatively connected to a first battery and a second battery, each battery having a positive and a negative terminal, the apparatus automatically connecting the two positive terminals and the two negative terminals without regard to the polarities of the two batteries, comprising:

a first terminal pair for connecting to the first battery;

a second terminal pair for connecting to the second battery; and a polarity independent automatic crossbar switch comprising:

a relative polarity detector for automatically detecting whether said first and second battery terminal pairs are connected to said first and second batteries in a parallel configuration, a cross configuration, or neither, and for generating appropriate logic signals thereupon;

a crossbar connector responsive to said logic signals for operatively connecting said first battery positive terminal to said second battery positive terminal, and for connecting said first battery negative terminal to said second battery negative terminal;

an undercurrent detector for detecting when current flowing between said first and second batteries falls below a predetermined threshold and for generating an undercurrent signal in response thereto; and a crossbar connector disabler responsive to said undercurrent signal for returning said crossbar connector to an unconnected state.

2. The apparatus defined in claim 1, wherein said polarity independent automatic crossbar switch further comprises:

rectifier means for supplying a positive voltage source to said relative polarity detector.

3. The apparatus defined in claim 1, wherein said crossbar connector disabler includes:

delay means operatively connected to said crossbar connector, said delay means for receiving said undercurrent signal and disabling said crossbar connector in response to said undercurrent signal after a predetermined period of time.

4. The apparatus defined in claim 3, wherein said delay means comprises:

a pulse generator, the pulse generator generating a pulse in response to said undercurrent signal occurring in conjunction with either a parallel configuration or a cross configuration being detected by said relative polarity detector;

wherein said crossbar connector means is disabled by said pulse.

5. The apparatus defined in claim 4, wherein:

said crossbar connector disabler includes:

a bilateral transistor device for disabling said logic signals.

6. A polarity independent battery jumper cable apparatus for vehicles and the like, which may be connected to a first battery and to a second battery without regard to polarity of either said first or second battery, the first and second batteries each having a positive and a negative terminal, the jumper cable comprising:

a first terminal pair for connecting to the first battery;

a second terminal pair for connecting to the second battery; and automatic crossbar switching means for automatically connecting said first terminal pair to said second terminal pair such that the positive and negative terminals of the first battery are connected to the positive and negative terminals of the second battery, respectively.

7. The apparatus defined in claim 6, wherein said automatic crossbar switching means comprises:

means for generating a first signal in response to a cross configuration being detected between said first battery and said second battery;

means for generating a second signal in response to a parallel configuration being detected between said first battery and said second battery; and a three position relay, said relay defining an open circuit in its unpowered state, said relay responsive to said first and second signals for establishing cross and parallel connections, respectively, between said first and second batteries.

8. The apparatus defined in claim 7, wherein said automatic crossbar switching means further comprises:

means for returning said three position relay to its unpowered state in response to said jumper cable apparatus becoming disconnected from either of said positive or negative terminals of either of said first or second batteries.

9. A battery jumper cable apparatus adapted for connection to first and second batteries without regard to polarities of the batteries, each battery having a positive terminal and a negative terminal, the apparatus comprising:

a first pair of battery terminal connectors for establishing electrical contact with the first battery;

a second pair of battery terminal connectors for establishing electrical contact with the second battery;

a polarity detector for sensing the polarity of the first battery relative to the second battery and for generating a polarity indicating signal in response thereto; and a switch for automatically connecting said battery terminal connectors according to the polarity indicating signal, such that the positive terminals of the first and second batteries are automatically electrically connected to one another, and the negative terminals of the first and second batteries are automatically electrically connected to one another.

10. The battery jumper cable apparatus of claim 9, further comprising:

a battery disconnect detector for detecting when at least one of said battery connectors becomes disconnected from its respective battery terminal, and for generating a battery disconnected signal in response thereto;

and wherein said switch disconnects said battery connectors from one another in response to the battery disconnected signal.

11. The battery jumper cable apparatus of claim 10, wherein:

said battery disconnect detector comprises an undercurrent detector.

12. The battery jumper cable apparatus of claim 11 wherein:

said switch is a crossbar switch.

13. The battery jumper cable apparatus of claim 11 further comprising:

an indicator light responsive to the undercurrent detector for indicating to a user that neither the first battery nor the second battery is being properly charged.

14. The battery jumper cable apparatus of claim 9 further comprising:

a current sensor for detecting when an overcurrent condition has occurred and for generating an overcurrent signal in response thereto;

and wherein the switch responds to the overcurrent signal by switching to a state in which none of said battery terminals is electrically connected to any other of said battery terminals.

15. The battery jumper cable apparatus of claim 14 further comprising:

a reset switch for returning the battery jumper cable apparatus to a ready state after said overcurrent condition has occurred.

* * * * *